UNITED STATES PATENT OFFICE.

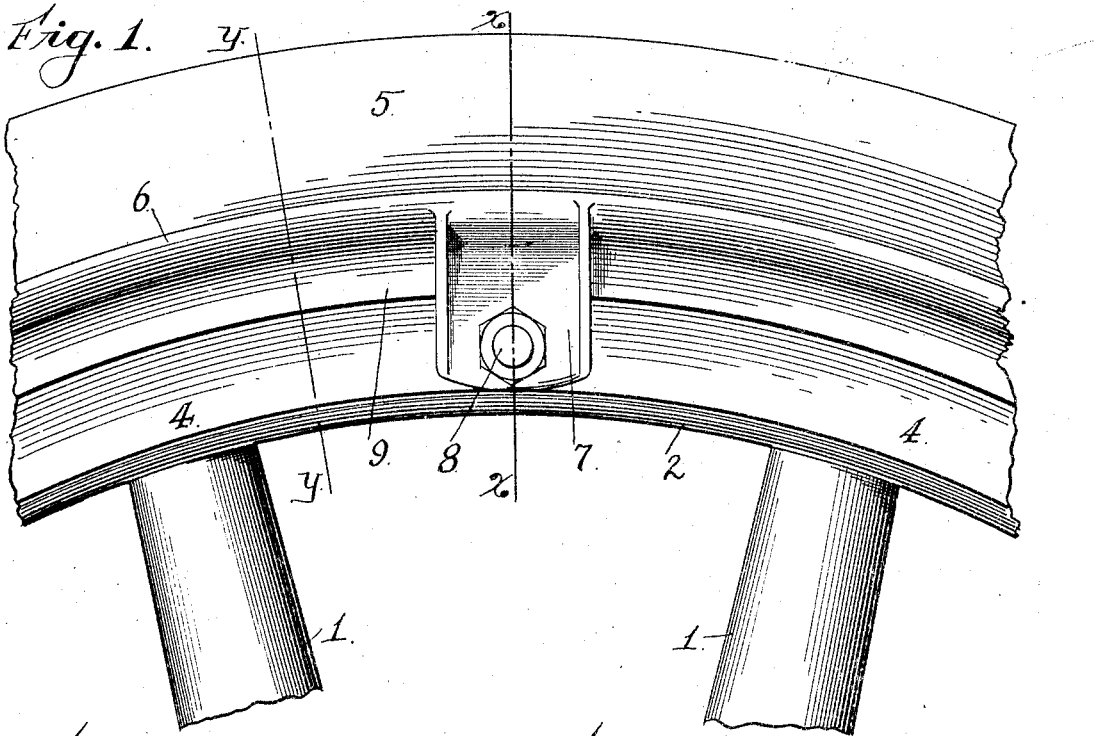

HAROLD W. CLAPP, OF BERKELEY, AND BLANCHARD COLLINS EDGAR, OF SAN FRANCISCO, CALIFORNIA.

CONVERTIBLE-TREAD WHEEL.

1,039,898.

Specification of Letters Patent. Patented Oct. 1, 1912.

Application filed May 29, 1911. Serial No. 630,100.

*To all whom it may concern:*

Be it known that we, HAROLD W. CLAPP and BLANCHARD COLLINS EDGAR, citizens of the United States, residing the said CLAPP at Berkeley, in the county of Alameda and State of California, and the said EDGAR in the city and county of San Francisco, State of California, have invented certain new and useful Improvements in Convertible-Tread Wheels, of which the following is a specification.

Our invention relates to wheels with convertible or changeable treads adapting them for use upon different surfaces.

Our invention is especially adapted for vehicles intended to run upon either rails or ordinary roads, and particluarly for railway emergency trucks, the necessities of whose operation require convenient and speedy change from one form of tread to the other.

Our invention consists in the novel construction of the convertible tire of the wheel which we shall hereinafter fully describe and claim, by reference to the accompanying drawings in which—

Figure 1 is a side elevation of a segmental portion of our wheel. Fig. 2 is a section on the line x—x of Fig. 1. Fig. 3 is a section on the line y—y of Fig. 1, showing the application of a tool for starting the road tire off, when said tire is to be removed.

1 and 2 are respectively the spokes and the felly of the wheel.

3 is the flanged tire adapted to run upon a rail, and which, for convenience, we will term the "rail" tire. This tire is held in place by the side retaining bands 4, which overlap the edges of said tire.

5 is the tire adapted for ordinary road surfaces, and which we will term the "road" tire. It may be made of any suitable material, preferably rubber. This road tire 5 is carried by a retaining ring 6 adapted to be removably fitted upon the rail tire 3. The outer side of the retaining ring 6 is formed at suitable intervals with a radially directed lug 7 which lies beside the outer retaining band 4, and receives a bolt 8 which passes through both bands 4 and the intervening felly 2, as seen in Fig. 2, and thus secures the ring 6 and the bands 4 to the felly. The ring 6 is also formed, on its outer side, with an annular lip 9, which, as shown in Fig. 3, lies parallel with but separated from the band 4. This lip provides a means for the tire-puller tool 10, (shown in Fig. 3) to act upon in starting said ring 6 with its road tire 5 off the rail tire 3, when said road tire is to be removed. When the road tire is removed, the wheel is ready to run upon a rail; and when the road tire is replaced, the wheel is adapted for ordinary road service.

Having thus described our invention, what we claim as new and desire to secure by Letters Patent is:—

A convertible tread wheel including a felly, a tire on the felly having a side flange whereby it is adapted for rail service, means for supporting said tire on the felly, a second tire adapted for road service, a retaining ring for the road tire superimposed on the rail tire, the adjacent surfaces of the retaining ring and rail tire inclining, integral separated lugs projecting inwardly from the outer edge of the retaining ring, and means to engage said lugs and felly whereby to force the opposite inclined surfaces of the rail tire and retaining ring into binding contact, and an annular integral annular flange also projecting inwardly from the retaining ring at a point separated from the side of the felly, substantially as and for the purpose described.

In testimony whereof we have signed our names to this specification in the presence of two subscribing witnesses.

HAROLD W. CLAPP.
BLANCHARD COLLINS EDGAR.

Witnesses:
JOSEPH J. FERRIER,
MABEL MITCHELL.